United States Patent
Kim et al.

(10) Patent No.: US 11,561,516 B2
(45) Date of Patent: Jan. 24, 2023

(54) METHOD FOR PROCESSING DATA USING NEURAL NETWORK AND ELECTRONIC DEVICE FOR SUPPORTING THE SAME

(71) Applicant: Samsung Electronics Co., Ltd., Suwon-si (KR)

(72) Inventors: Sunghyun Kim, Suwon-si (KR); Ohsang Kwon, Suwon-si (KR); Minjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 16/682,243

(22) Filed: Nov. 13, 2019

(65) Prior Publication Data

US 2020/0150598 A1    May 14, 2020

(30) Foreign Application Priority Data

Nov. 13, 2018  (KR) .................. 10-2018-0138980

(51) Int. Cl.
  *G05B 13/02*  (2006.01)
  *G06N 3/063*  (2006.01)

(52) U.S. Cl.
  CPC .......... *G05B 13/027* (2013.01); *G06N 3/063* (2013.01)

(58) Field of Classification Search
  CPC .... G05B 13/027; G06N 3/063; G06N 3/0472; G06N 3/0445; G06N 3/0454; G06N 3/082; G06N 3/08; G06N 3/04
  See application file for complete search history.

(56) References Cited

U.S. PATENT DOCUMENTS

| | | | |
|---|---|---|---|
| 9,818,059 B1* | 11/2017 | Woo .................... | G06F 17/16 |
| 2016/0358069 A1 | 12/2016 | Brothers et al. | |
| 2018/0129893 A1* | 5/2018 | Son ...................... | G06V 10/95 |

(Continued)

FOREIGN PATENT DOCUMENTS

KR   10-2017-0128080 A   11/2017

OTHER PUBLICATIONS

International Search Report and Written Opinion dated Feb. 27, 2020, issued in International Application No. PCT/KR2019/015449.

(Continued)

*Primary Examiner* — Patrice L Winder
(74) *Attorney, Agent, or Firm* — Jefferson IP Law, LLP

(57) ABSTRACT

An electronic device is provided. The electronic device includes a switch configured to select a mode of the electronic device, a multiply and accumulate (MAC) array configured to include a plurality of MAC units, and at least one processor configured to include a zero weight skip unit for confirming a first weight having a value of '0' among weights related with input data, and for forwarding a second weight not having a value of '0' among the weights, to the MAC array. The at least one processor is configured to acquire the input data, acquire the weights, select the mode of the electronic device by using the switch, in response to a first mode of the electronic device being selected, perform convolution operations between the input data and the second weight forwarded to the MAC array through the zero weight skip unit, and, in response to a second mode of the electronic device being selected, perform convolution operations between the input data and the weights forwarded to the MAC array.

13 Claims, 11 Drawing Sheets

(56) References Cited

U.S. PATENT DOCUMENTS

| | | | |
|---|---|---|---|
| 2018/0129935 A1 | 5/2018 | Kim et al. | |
| 2018/0145904 A1 | 5/2018 | Alleman et al. | |
| 2018/0157970 A1 | 6/2018 | Henry et al. | |
| 2018/0285715 A1 | 10/2018 | Son et al. | |
| 2018/0322390 A1* | 11/2018 | Das | G06F 9/30036 |
| 2019/0041961 A1* | 2/2019 | Desai | G06N 3/08 |
| 2019/0205740 A1* | 7/2019 | Judd | G06N 3/0454 |
| 2019/0340498 A1* | 11/2019 | Mills | G06N 3/0454 |
| 2021/0357734 A1* | 11/2021 | Mahale | G06N 3/0454 |

OTHER PUBLICATIONS

Jin Hee Kim et al., "FPGA-based CNN inference accelerator synthesized from multi-threaded C software," 2017 30th IEEE International System-on-Chip Conference (SOCC), Munich, 2017, pp. 268-273.

Kim et al., "A Novel Zero Weight/Activation-Aware Hardware Architecture of Convolutional Neural Network", Design, Automation & Test in Europe Conference & Exhibition, Mar. 1, 2017, pp. 1462-1467, XP055761039, ISBN: 978-3-9815370-8-6.

Yonekawa et al., "A Ternary Weight Binary Input Convolutional Neural Network: Realization on the Embedded Processor", 2018 IEEE 48th International Symposium on Multiple-Valued Logic (ISMVL), IEEE, May 16, 2018, pp. 174-179, XP033376213.

European Search Report dated May 25, 2022, issued in European Application No. 19883790.8.

\* cited by examiner

FIG.3

METHOD FOR PROCESSING DATA USING NEURAL NETWORK AND ELECTRONIC DEVICE FOR SUPPORTING THE SAME

CROSS-REFERENCE TO RELATED APPLICATION(S)

This application is based on and claims priority under 35 U.S.C. § 119(a) of a Korean patent application number 10-2018-0138980, filed on Nov. 13, 2018, in the Korean Intellectual Property Office, the disclosure of which is incorporated by reference herein in its entirety.

BACKGROUND

1. Field

The disclosure relates to a method for processing data by using a neural network and an electronic device for supporting the same.

2. Description of Related Art

Neural networks refer to computational architectures modeling a biological brain. In the neural networks, nodes corresponding to neurons of the brain are connected with one another, and collectively operate to process input data. The neural networks are convolutional neural networks (CNN), recurrent neural networks (RNN), deep belief networks, restricted Boltzman machines, etc., but an embodiment is not limited to these.

A server can use the neural network to learn data and provide an algorithm of the learned data to an electronic device in a binary form.

The above information is presented as background information only to assist with an understanding of the disclosure. No determination has been made, and no assertion is made, as to whether any of the above might be applicable as prior art with regard to the disclosure.

SUMMARY

An electronic device can process input data (e.g., image data) on the basis of an algorithm of learned data provided from a server. For example, when the electronic device processes the input data on the basis of weights provided from the server, the electronic device needs to perform a mathematical operation between the weights (weights necessary for obtaining an edge or gradient in an image) and the input data in consideration of various situations of the electronic device.

Aspects of the disclosure are to address at least the above-mentioned problems and/or disadvantages and to provide at least the advantages described below. Accordingly, an aspect of the disclosure is to provide a method for processing data by using a neural network and an electronic device for supporting the same, controlling a mathematical operation between weights and input data according to a situation of the electronic device.

Additional aspects will be set forth in part in the description which follows and, in part, will be apparent from the description, or may be learned by practice of the presented embodiments.

Technological solutions the disclosure seeks to achieve are not limited to the above-mentioned technological solutions, and other technological solutions not mentioned above would be able to be clearly understood by a person having ordinary skill in the art from the following statement.

In accordance with an aspect of the disclosure, an electronic device is provided. The electronic device includes a switch configured to select a mode of the electronic device, and multiply and accumulate (MAC) array configured to include a plurality of MAC units, and at least one processor configured to include a zero weight skip unit for confirming a first weight having a value of '0' among weights related with input data, and for forwarding a second weight not having a value of '0' among the weights, to the MAC array. The at least one processor may be configured to acquire the input data, acquire the weights, select the mode of the electronic device by using the switch, in response to a first mode of the electronic device being selected, perform convolution operations between the input data and the second weight forwarded to the MAC array through the zero weight skip unit, and, in response to a second mode of the electronic device being selected, perform convolution operations between the input data and the weights forwarded to the MAC array.

In accordance with another aspect of the disclosure, an electronic device is provided. The electronic device includes a switch configured to select a mode of the electronic device, and a MAC array configured to include a plurality of MAC units, and a zero weight skip unit configured to confirm a first weight having a value of '0' among weights related with input data, and forward a second weight not having a value of '0' among the weights, to the MAC array, and at least one processor configured to include a MAC activation control unit for enabling to forward the weights to the MAC array, and for inactivating at least one MAC unit corresponding to the first weight among the plurality of MAC units included in the MAC array and activating at least one MAC unit corresponding to the second weight. The at least one processor may be configured to acquire the input data, acquire the weights, select the mode of the electronic device by using the switch, in response to a first mode of the electronic device being selected, perform convolution operations between the input data and the second weight forwarded to the MAC array through the zero weight skip unit, and, in response to a third mode of the electronic device being selected, perform convolution operations between the input data and the weights forwarded to the MAC array through the MAC activation control unit.

In accordance with another aspect of the disclosure, a method is provided. The method includes acquiring input data, acquiring weights related with the input data, selecting a mode, in response to a first mode being selected, performing convolution operations between the input data, and the second weight forwarded to a MAC array through a zero weight skip unit for confirming a first weight having a value of '0' among the weights and forwarding a second weight not having a value of '0' among the weights, to the MAC array, and in response to a third mode being selected, performing convolution operations between the input data, and the weights forwarded to the MAC array.

A method for processing data by using a neural network and an electronic device for supporting the same according to various embodiments of the disclosure may improve performance and power efficiency, by controlling a mathematical operation between weights and input data according to a situation of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram for explaining a method for performing convolution operations between input data and weights, according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
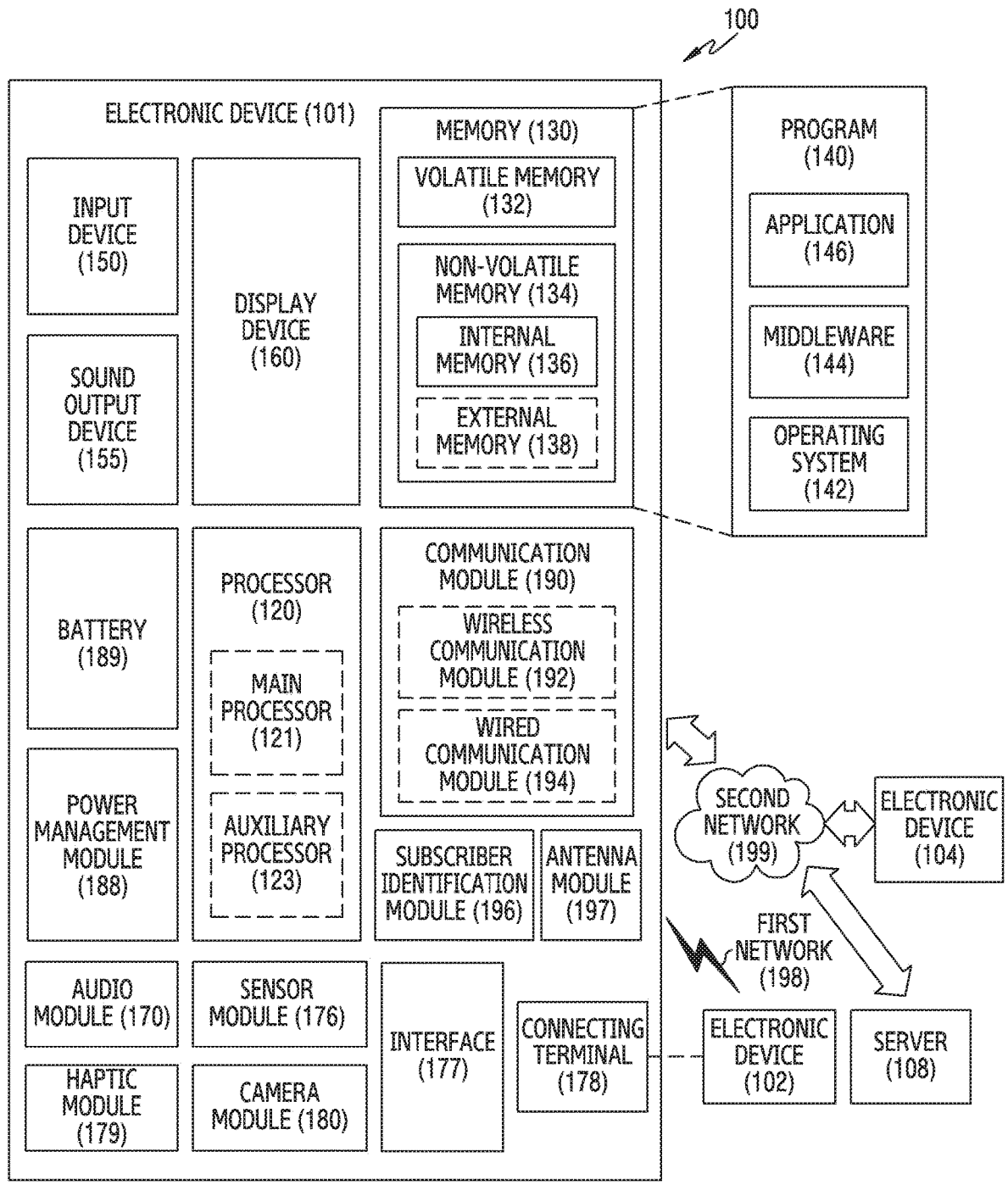
FIG. 1 is a block diagram of an electronic device within a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
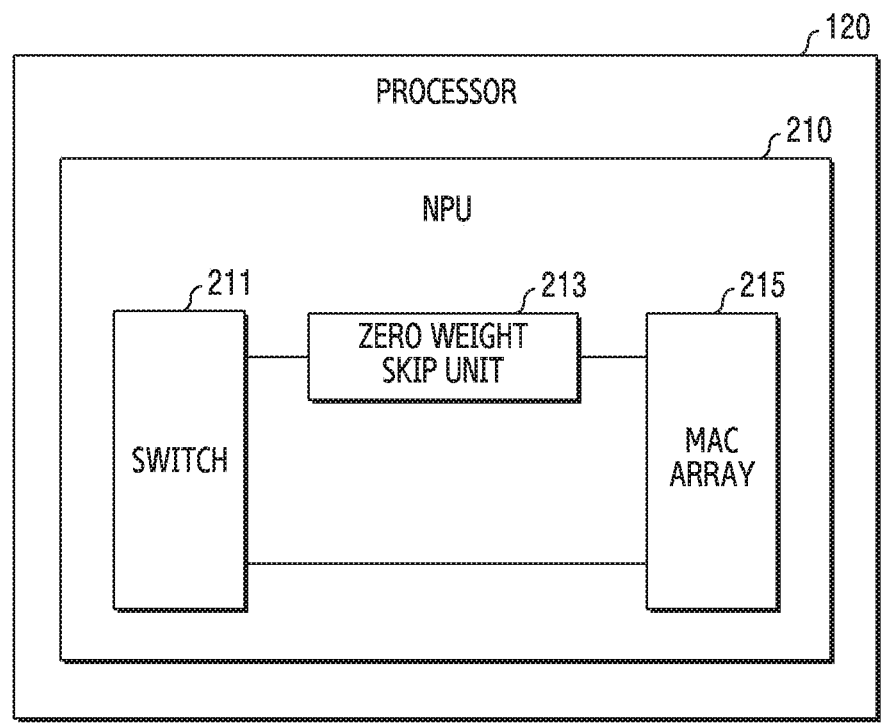
FIG. 2 is a diagram illustrating a processor for processing input data by using a neural network, according to an embodiment of the disclosure.

FIG. 2 is a diagram illustrating a processor for processing input data by using a neural network, according to an embodiment of the disclosure.

Figure 3:
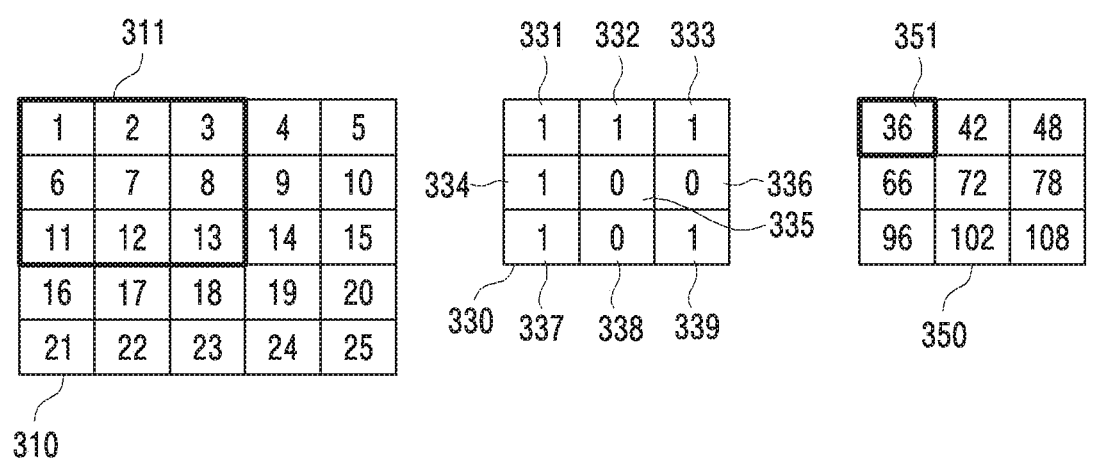

FIG. 3 is a diagram for explaining a method for performing convolution operations between input data and weights, according to an embodiment of the disclosure.

Figure 4:
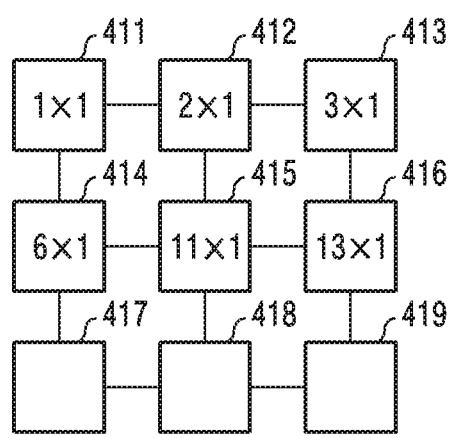
FIG. 4 is a diagram illustrating a multiply and accumulate (MAC) array for performing a convolution operation by using a zero weight skip unit, according to an embodiment of the disclosure.

FIG. 4 is a diagram illustrating a multiply and accumulate (MAC) array for performing a convolution operation by using a zero weight skip unit, according to an embodiment of the disclosure.

Referring to FIGS. 2 to 4, in an embodiment, the processor 120 may perform a general operation for processing input data by using a neural network. In an embodiment, the processor 120 is at least partially the same as or similar with the processor 120 of FIG. 1.

In an embodiment, the processor 120 may include a neural processor unit (NPU) 210.

In an embodiment, the NPU 210 may perform at least part of an input data processing operation that uses the neural network. In an embodiment, the NPU 210 may be a construction dedicated to the input data processing operation that uses the neural network.

In an embodiment, the NPU 210 may include a switch 211, a zero weight skip unit 213, and a MAC array 215.

In an embodiment, the switch 211 may receive weights related with input data, from a server (e.g., the server 108) to the electronic device 101.

In an embodiment, the weights may be an algorithm of data learned through the neural network in the server. In an embodiment, the weights may include a weight (used together with a 'first weight" below) having a value of '0' and a weight (used together with a 'second weight" below) not having a value of '0', through a pruning operation (or a quantization operation) in the server (e.g., the server 108). For example, through a quantization operation in the server (e.g., the server 108), a weight having a value of a specified threshold or less among the weights of the neural network may be altered into the value of '0'. In an embodiment, the server may perform a retraining operation after performing the pruning operation.

In an embodiment, the weights may be denoted as a kernel (or a convolution kernel), a filter, and/or a weight matrix.

In an embodiment, the switch 211 may perform a switching operation, at least partially on the basis of a control signal received from the processor 120. For example, the switch 211 may be connected with a weight to the zero weight skip unit 213 or be connected (or directly connected) with the MAC array 215, at least partially on the basis of a control signal for selecting a mode of the electronic device 101 received from the processor 120.

In an embodiment, the switch 211 may be implemented as a 1:2 demultiplexer for receiving weights and forwarding the same to the zero weight skip unit 213 or the MAC array 215.

In an embodiment, the zero weight skip unit 213 may forward the second weight among the weights received from the switch 211. In an embodiment, the zero weight skip unit 213 may confirm the first weight having the value of '0' (or the second weight not having a value of '0') among the weights received from the switch 211. The zero weight skip unit 213 may confirm a position (or a coordinate) of the first weight in the weights received from the switch 211.

In an embodiment, the zero weight skip unit 213 may control convolution operations between input data and the second weight, carried out by the MAC array 215. In an embodiment, the zero weight skip unit 213 may schedule the convolution operations between the input data and the second weight, carried out by the MAC array 215.

In an embodiment, the MAC array 215 may include a plurality of MAC units (or may be a set of the plurality of MAC units).

In an embodiment, the MAC array 215 may perform convolution operations between input data and weights. In an embodiment, each of a plurality of MAC units (or a MAC unit) may perform a multiplication and accumulation operation between each value of the input data and each value of the weights.

In an embodiment, in response to receiving weights from the switch 211, the MAC array 215 may perform convolution operations between the received weights and the input data.

Referring to FIG. 3, in an embodiment, in response to receiving the weights 330 from the switch 211, the MAC array 215 may perform convolution operations between input data 310 and the weights 330 (e.g., weights 331, 332, 333, 334, 335, 336, 337, 338, and 339). For example, the MAC array 215 may perform, at a first cycle, convolution operations between values (or components) of a 3×3 region 311 of a left top portion among 5×5 input data, and the weights 330. At the first cycle, a value (or component) 351 of output data 350 may be '36' (1*1+2*1+3*1+6*1+7*0+ 8*0+11*1+12*0+13*1). The MAC array 215 may perform, at a second cycle, convolution operations between the weights and a 3×3 region (e.g., (1,2), (1,3), (1,4), (2,2), (2,3), (2,4), (3,2), (3,3), (3,4) of the input data) corresponding to a region moved (or shifted) to the right, for example, by one cell interval (or stride) from the 3×3 region 311 of the first cycle. At the second cycle, a value of the output data 350 may be '42' (2*1+3*1+4*1+7*1+8*0+9*0+12*1+13*0+ 14*1). By performing a third cycle to a ninth cycle in the same manner as the first cycle and the second cycle, the MAC array 215 may provide (or acquire) the output data 350. In an embodiment, a MAC unit may perform a multiplication (or multiplication and accumulation) operation between each value (or component) (e.g., value '1') of the input data 310 and each value of the weights 330 (e.g., the weight 331). FIG. 3 exemplifies the 5×5 input data as the input data 310 and exemplifies the 3×3 weights as the weights 330, but an embodiment is not limited to this. Also, the convolution operation of FIG. 3 is an example, and an embodiment is not limited to this.

In an embodiment, in response to receiving the second weight from the zero weight skip unit 213, the MAC array 215 may perform convolution operations between the input data and the second weight.

In an embodiment, the MAC array 215 may receive the second weight (e.g., the weights 331, 332, 333, 334, 337, and 339) from the zero weight skip unit 213. In an embodiment, the MAC array 215 may perform convolution operations between the second weight and values corresponding to a region of the input data corresponding to the second weight. For example, as illustrated in FIG. 4, at a first cycle, a MAC unit 411 may perform a multiplication operation between a value '1' of the input data 310 and a value '1' of the weight 331, a MAC unit 412 may perform a multiplication operation between a value '2' of the input data 310 and a value '1' of the weight 332, a MAC unit 413 may perform a multiplication operation between a value '3' of the input data 310 and a value '1' of the weight 333, a MAC unit 414 may perform a multiplication operation between a value '6' of the input data 310 and a value '1' of the weight 334, a MAC unit 415 may perform a multiplication operation between a value '11' of the input data 310 and a value '1' of the weight 337, and a MAC unit 416 may perform a multiplication operation between a value '13' of the input data 310 and a value '1' of the weight 339. In an embodiment, MAC units 417, 418, and 419 may perform a convolution operation of a second cycle. In an embodiment, in response to performing convolution operations between the input data and the second weight through the zero weight skip unit 213, all MAC units included in the MAC array 215 may be utilized (much input data may be processed) and thus, data processing performance (e.g., a data processing speed) may be improved.

In an embodiment, the processor 120 (e.g., the main processor 121 of FIG. 1) or a central processing unit (CPU)) may control a general operation of processing input data.

In an embodiment, the processor 120 may acquire input data. For example, in response to an input related with the execution of a function of an application (e.g., a camera application), the processor 120 may acquire the input data (e.g., image data).

In an embodiment, the processor 120 may acquire weights related with input data (e.g., weights necessary for obtaining an edge or gradient in an image). For example, the processor 120 may acquire, from a server (e.g., the server 108), weights learned using a neural network. In an embodiment, the processor 120 may store, in the memory 130, the weights acquired from the server (e.g., the server 108). In an embodiment, at input data acquisition, the processor 120 may confirm weights related with input data and acquire (or search) the confirmed weights.

In an embodiment, the processor 120 may select a mode of the electronic device 101 (or used together with a 'mode of the NPU 210') through the switch 211. For example, the processor 120 may select, through the switch 211, a mode (hereinafter, referred to as a 'first mode') of performing a convolution operation for weights by using the zero weight skip unit 213 or a mode (hereinafter, referred to as a 'second mode') of performing the convolution operation without using the zero weight skip unit 213 (or by forwarding the weights from the switch 211 directly to the MAC array 215). In an embodiment, the main processor 121 may forward, to the NPU 210, a control signal for selecting (or controlling) the mode of the NPU 210. The NPU 210 may control the switch 211 on the basis of the control signal received from the main processor 121, thereby selecting a first mode or a second mode. In an embodiment, the NPU 210 may be included in the auxiliary processor 123.

In an embodiment, the processor 120 may provide a mode of the electronic device 101, at least partially on the basis of a situation of the electronic device 101.

In an embodiment, the processor 120 may provide a mode of the electronic device 101, at least partially on the basis of a setting of the electronic device 101.

In an embodiment, in response to input data being image data, the processor 120 may provide a mode of the electronic device 101, at least partially on the basis of a resolution setting. For example, in response to acquiring image data from a camera (e.g., the camera module 180), the main processor 121 may provide a mode of the NPU 210 according to a set resolution. The main processor 121 may forward, to the NPU 210, a control signal for enabling the NPU 210 to operate in the provided mode.

In an embodiment, in response to a resolution of a raw image acquired through a camera (e.g., the camera module 180) being set as a specified resolution or more (e.g., full high-definition (FHD), wide quad high-definition (WQHD), or ultra high-definition (UHD)), the processor 120 may provide a mode of the electronic device 101 as a first mode. In response to the resolution of the input image being set less than the specified resolution, the processor 120 may provide the mode of the electronic device 101 as a second mode.

For another example, in response to a resolution of an output image (e.g., a resolution of an image processed through the camera module 180 or an image displayed as a preview screen, or a resolution at the time of storing an acquired image) being set as a specified resolution or more, the processor 120 may provide a mode of the electronic device 101 as a first mode. In response to the resolution of the output image being set less than the specified resolution, the processor 120 may provide the mode of the electronic device 101 as a second mode. In an embodiment, in response to the resolution of the image data being set as the specified resolution or more, the processor 120 may provide the mode of the electronic device 101 as the first mode, thereby processing the image data with better performance (or at a faster speed). However, the setting of the electronic device 101 is not limited to the aforementioned resolution setting.

In an embodiment, the processor 120 may provide a mode of the electronic device 101, at least partially on the basis of a specified application or a specified function of the application. For example, in response to acquiring input data, the main processor 121 may confirm an application that is being executed in the electronic device 101 or a function of the application. The main processor 121 may provide a mode of the NPU 210, according to an ongoing application of the electronic device 101 or a function of the application. The main processor 121 may forward, to the NPU 210, a control signal for enabling the NPU 210 to operate in the provided mode.

In an embodiment, in response to acquiring input data related with an application which, at execution, consumes a load or power of a system of a specified quantity or more or a function of the application, the processor 120 may provide a mode of the electronic device 101 as a second mode. In response to acquiring input data related with an application which, at execution, consumes a load or power of the system less than the specified quantity or a function of the application, the processor 120 may provide the mode of the electronic device 101 as a first mode. In an embodiment, in response to acquiring the input data related with the application which, at execution, consumes the load or power of the system of the specified quantity or more or the function of the application, the processor 120 may provide the mode of the electronic device 101 as the second mode, thereby consuming power efficiently (or sustainably).

In an embodiment, the processor 120 may provide a mode of the electronic device 101, at least partially on the basis of a consumed power (or a power consumption state) of the electronic device 101. For example, in response to acquiring input data (e.g., image data), the main processor 121 may confirm a consumed power state of the electronic device 101. The main processor 121 may provide a mode of the NPU 210 according to the consumed power state of the electronic device 101. The main processor 121 may forward, to the NPU 210, a control signal for enabling the NPU 210 to operate in the provided mode.

In an embodiment, in response to a brightness of a display (e.g., the display device 160) being equal to or being greater than a specified brightness (e.g., 200 candelas), the processor 120 may provide a mode of the electronic device 101 as a second mode. In response to the brightness of the display (e.g., the display device 160) being less than the specified brightness, the processor 120 may provide the mode of the electronic device 101 as a first mode.

In an embodiment, the processor 120 may provide a mode of the electronic device 101, at least partially on the basis of a state of a battery. For example, in response to acquiring input data (e.g., image data) (or in response to acquiring data that will be processed through a mathematical operation with weights), the main processor 121 may provide a mode of the NPU 210 according to the state of the battery. The main processor 121 may forward, to the NPU 210, a control signal for enabling the NPU 210 to operate in the provided mode.

In an embodiment, in response to a remnant level of the battery 189 being less than a specified remnant level or the battery 189 being in a power saving mode, the processor 120 may provide a mode of the electronic device 101 as a second mode. In response to the remnant level of the battery 189 being equal to or being greater than the specified remnant level or the battery 189 being in a normal mode, the processor 120 may provide the mode of the electronic device 101 as a first mode.

In an embodiment, the processor 120 may provide a mode of the electronic device 101, at least partially on the basis of a temperature (or heating state) of the electronic device 101. For example, in response to the temperature of the electronic device 101 being equal to or being greater than a specified temperature, the processor 120 may provide the mode of the electronic device 101 as a second mode. In response to the temperature of the electronic device 101 being less than the specified temperature, the processor 120 may provide the mode of the electronic device 101 as a first mode.

In an embodiment, the processor 120 may provide a mode of the electronic device 101, at least partially on the basis of a load of a system. For example, in response to acquiring input data (e.g., image data), the main processor 121 may provide a mode of the NPU 210 according to the load of the system. The main processor 121 may forward, to the NPU 210, a control signal for enabling the NPU 210 to operate in the provided mode.

In an embodiment, in response to a current load of a system being equal to or being greater than a specified load, the processor 120 may provide a mode of the electronic device 101 as a second mode. In response to the current load of the system being less than the specified load, the processor 120 may provide the mode of the electronic device 101 as a first mode.

In an embodiment, the processor 120 may provide a mode of the electronic device 101 according to a rate (or the number) of a weight having a value '0' in weights. For example, in response to acquiring input data (e.g., image data), the main processor 121 may confirm weights related with the input data. The main processor 121 may confirm a rate (or the number) of a weight having the value '0' in the weights related with the input data. The main processor 121 may provide a mode of the NPU 210 according to the rate (or the number) of the weight having the value '0' in the weights. The main processor 121 may forward, to the NPU 210, a control signal for enabling the NPU 210 to operate in the provided mode.

In an embodiment, in response to a rate (or the number) of a weight having a value '0' in weights being equal to or being greater than a specified rate, the processor 120 may provide a mode of the electronic device 101 as a first mode. In response to the rate (or the number) of the weight having the value '0' in the weights being less than the specified rate, the processor 120 may provide the mode of the electronic device 101 as a second mode.

In an embodiment, the processor 120 may provide a mode of the electronic device 101, at least partially on the basis of a user input. For example, the main processor 121 may receive a user input of selecting a first mode or a second mode. The main processor 121 may provide a mode of the NPU 210, at least partially on the basis of the received user input. The main processor 121 may forward, to the NPU 210, a control signal for enabling the NPU 210 to operate in the provided mode.

In an embodiment, the processor 120 may control an operation of the switch 211 to select a provided mode of the electronic device 101. For example, in response to a first mode being selected, the processor 120 may forward a control signal to the switch 211 wherein the switch 211 is connected with the zero weight skip unit 213. In response to a second mode being selected, the processor 120 may forward a control signal to the switch 211 wherein the switch 211 is connected with the MAC array 215.

However, an example in which the processor 120 provides a mode of the electronic device 101 is not limited to the aforementioned example.

In an embodiment, the switch 211, the zero weight skip unit 213, and the MAC array 215 may be implemented as hardware.

Though not illustrated in FIG. 2, the NPU 210 may include a processor (e.g., a micro controller unit (MCU)) for performing a general operation of the NPU 210 at least partially on the basis of a control signal received from the processor 120.

Figure 5:
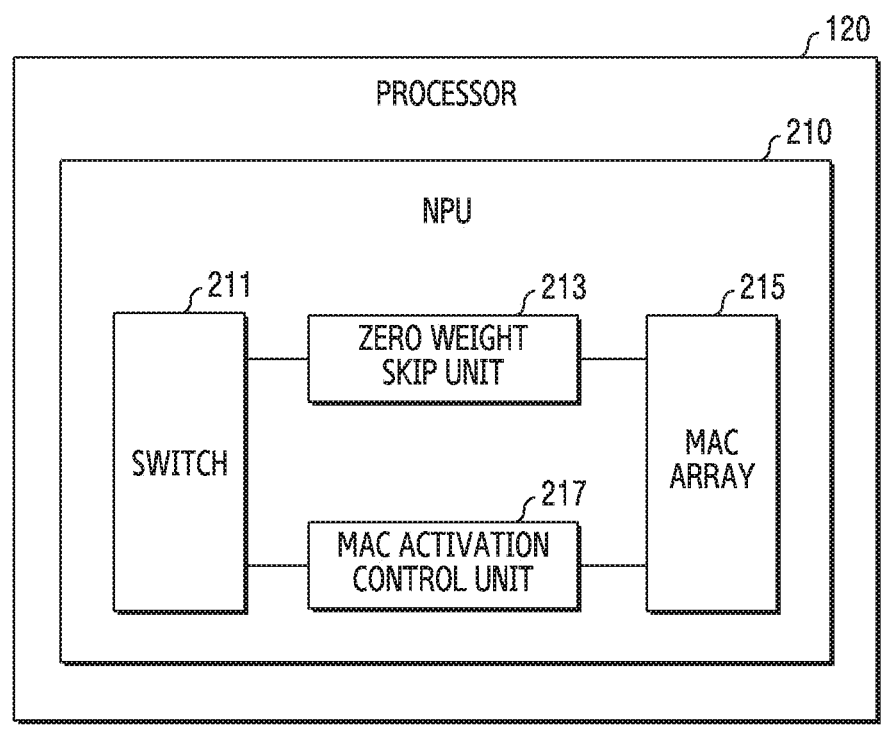
FIG. 5 is a diagram illustrating a processor for processing input data by using a neural network, according to an embodiment of the disclosure.

FIG. 5 is a diagram illustrating a processor for processing input data by using a neural network, according to an embodiment of the disclosure.

Figure 6:
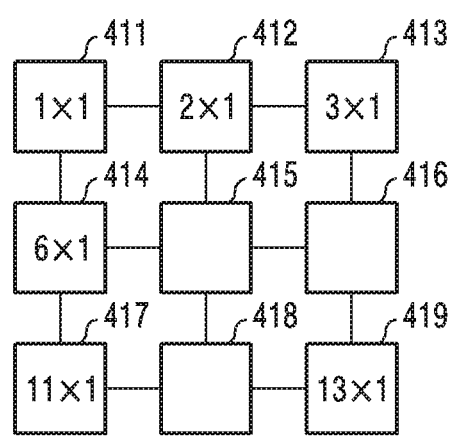
FIG. 6 is a diagram illustrating a MAC array for performing a convolution operation by using a MAC activation control unit, according to an embodiment of the disclosure.

FIG. 6 is a diagram illustrating a MAC array for performing a convolution operation by using a MAC activation control unit, according to an embodiment of the disclosure.

Referring to FIGS. 5 and 6, the processor 120 (or the NPU 210) may further include a MAC activation control unit 217, as compared to the processor 120 of FIG. 3. A description overlapping with FIG. 3 is omitted below.

In an embodiment, the MAC activation control unit 217 may receive weights from the switch 211 and forward the received weights to the MAC array 215.

In an embodiment, the MAC activation control unit 217 may control convolution operations between input data and weights, carried out by the MAC array 215. For example, the MAC activation control unit 217 may confirm a first weight having a value '0' in the weights. The MAC activation control unit 217 may inactivate a MAC unit corresponding to a first weight (or a position of the first weight) and activate a MAC unit corresponding to a second weight (or a position of the second weight). The MAC activation control unit 217 may control the MAC array 215 to perform convolution operations between input data inputted to the activated MAC unit and the second weight. For example, as illustrated in FIG. 6, in response to the MAC array 215 performing convolution between the 3×3 region 311 and the weights 330 at a first cycle, the MAC activation control unit 217 may inactivate MAC units 415, 416, and 418 to which values 335, 336, and 338 of first weights are inputted, and activate MAC units 411, 412, 413, 414, 417, and 419 to which second weights 331, 332, 333, 334, 337, and 339 are inputted. The MAC array 215 may perform multiplication (or multiplication and accumulation) between values (e.g., '1', '2', '3', '6', '11', and '13') of the 3×3 region 311 inputted to the activated MAC units and the second weights 331, 332, 333, 334, 337, and 339.

In an embodiment, to omit a multiplication operation between a first weight and values of input data corresponding to the first weight, the MAC activation control unit 217 may inactivate the MAC units 415, 416, and 418, thereby decreasing power consumed for processing the input data.

In an embodiment, the processor 120 (e.g., the main processor 121 of FIG. 1) or a central processing unit (CPU)) may control a general operation of processing input data.

In an embodiment, the processor 120 may acquire input data.

In an embodiment, the processor 120 may acquire weights related with input data.

In an embodiment, the processor 120 may select a mode of the electronic device 101 through the switch 211. For example, the processor 120 may select, through the switch 211, a mode (hereinafter, referred to as a 'first mode') of performing a convolution operation for weights by using the zero weight skip unit 213 or a mode (hereinafter, referred to as a 'third mode') of performing the convolution operation by using the MAC activation control unit 217.

In an embodiment, the processor 120 may provide a mode of the electronic device 101, at least partially on the basis of a situation of the electronic device 101.

In an embodiment, the processor 120 may provide a mode of the electronic device 101, at least partially on the basis of a setting of the electronic device 101.

In an embodiment, in response to input data being image data, the processor 120 may provide a mode of the electronic device 101, at least partially on the basis of a resolution setting. For example, in response to a resolution of a raw image acquired through a camera (e.g., the camera module 180) being set as a specified resolution or more, the processor 120 may provide the mode of the electronic device 101 as a first mode. In response to the resolution of the input image being set less than the specified resolution, the processor 120 may provide the mode of the electronic device 101 as a third mode. For another example, in response to a resolution of an output image being set as a specified resolution or more, the processor 120 may provide the mode of the electronic device 101 as the first mode. In response to the resolution of the output image being set less than the specified resolution, the processor 120 may provide the mode of the electronic device 101 as the third mode.

In an embodiment, the processor 120 may provide a mode of the electronic device 101, at least partially on the basis of a specified application or a specified function of the specified application. For example, in response to acquiring input data related with an application which, at execution, consumes a load or power of a system of a specified quantity or more or a function of the application, the processor 120 may provide the mode of the electronic device 101 as a third mode. In response to acquiring input data related with an application which, at execution, consumes a load or power of a system less than the specified quantity or a function of the application, the processor 120 may provide the mode of the electronic device 101 as a first mode.

In an embodiment, the processor 120 may provide a mode of the electronic device 101, at least partially on the basis of a consumed power of the electronic device 101. For example, in response to a brightness of a display (e.g., the display device 160) being equal to or being greater than a specified brightness (e.g., 200 candelas), the processor 120 may provide the mode of the electronic device 101 as a third mode. In response to the brightness of the display (e.g., the display device 160) being less than the specified brightness, the processor 120 may provide the mode of the electronic device 101 as a first mode.

In an embodiment, the processor 120 may provide a mode of the electronic device 101, at least partially on the basis of a state of the battery 189. For example, in response to a remnant level of the battery 189 being less than a specified remnant level or the battery 189 being in a power saving mode, the processor 120 may provide the mode of the electronic device 101 as a third mode. In response to the remnant level of the battery 189 being equal to or being greater than the specified remnant level or the battery 189 being in a normal mode, the processor 120 may provide the mode of the electronic device 101 as a first mode.

In an embodiment, the processor 120 may provide a mode of the electronic device 101, at least partially on the basis of a temperature of the electronic device 101. For example, in response to the temperature of the electronic device 101 being equal to or being greater than a specified temperature, the processor 120 may provide the mode of the electronic device 101 as a third mode. In response to the temperature of the electronic device 101 being less than the specified temperature, the processor 120 may provide the mode of the electronic device 101 as a first mode.

In an embodiment, the processor 120 may provide a mode of the electronic device 101, at least partially on the basis of a load of a system. For example, in response to a current load of the system being equal to or being greater than a specified load, the processor 120 may provide the mode of the electronic device 101 as a third mode. In response to the current load of the system being less than the specified load, the processor 120 may provide the mode of the electronic device 101 as a first mode.

In an embodiment, the processor 120 may provide a mode of the electronic device 101 according to a rate (or the number) of a weight having a value '0' in weights. For example, in response to the rate (or the number) of the weight having the value '0' in the weights being equal to or being greater than a specified rate, the processor 120 may provide the mode of the electronic device 101 as a first mode. In response to the rate (or the number) of the weight having the value '0' in the weights being less than the specified rate, the processor 120 may provide the mode of the electronic device 101 as a third mode.

In an embodiment, the processor 120 may provide a mode of the electronic device 101, at least partially on the basis of a user input. For example, the processor 120 may provide the mode of the electronic device 101, at least partially on the basis of a user input of selecting a first mode or a third mode.

However, an example in which the processor 120 provides the mode of the electronic device 101 is not limited to the aforementioned example.

In an embodiment, the switch 211, the zero weight skip unit 213, the MAC activation control unit 217, and the MAC array 215 may be implemented as hardware.

Though not illustrated in FIG. 2, the NPU 210 may include the processor 120 (e.g., a micro controller unit (MCU)) for performing a general operation of the NPU 210, at least partially on the basis of a control signal received from the processor 120.

The electronic device 101 of various embodiments of the disclosure may include the switch 211 configured to select a mode of the electronic device 101, the MAC array 215 configured to include a plurality of MAC units, and at least one processor 120 configured to include the zero weight skip unit 213 for confirming a first weight having a value of '0' among weights related with input data and forwarding a second weight not having a value of '0' among the weights, to the MAC array 215. The at least one processor 120 may be configured to acquire the input data, and acquire the weights, and select the mode of the electronic device 101 by using the switch 211, and in response to a first mode of the electronic device 101 being selected, perform convolution operations between the input data, and the second weight forwarded to the MAC array 215 through the zero weight skip unit 213, and in response to a second mode of the electronic device 101 being selected, perform convolution operations between the input data, and the weights forwarded to the MAC array 215.

In various embodiments, the at least one processor 120 may be configured to, in response to the input data being image data, select the mode of the electronic device 101 at least partially on the basis of a resolution of the image data.

In various embodiments, the at least one processor 120 may be configured to select the mode of the electronic device 101 according to whether the input data is data related with a specified application or a specified function of the application.

In various embodiments, the at least one processor 120 may be configured to select the mode of the electronic device 101 on the basis of at least one of a consumed power of the electronic device 101, a state of the battery 189, or a temperature of the electronic device 101.

In various embodiments, the at least one processor 120 may be configured to select the mode of the electronic device 101, at least partially on the basis of a load of a system.

In various embodiments, the at least one processor 120 may be configured to select the mode of the electronic device 101 on the basis of a user input of selecting the first mode or the second mode.

In various embodiments, the at least one processor 120 may be configured to include the NPU 210 including the switch 211, the MAC array 215, and the zero weight skip unit 213.

The electronic device 101 of various embodiments of the disclosure may include the switch 211 configured to select a mode of the electronic device 101, the MAC array 215 configured to include a plurality of MAC units, the zero weight skip unit 213 configured to confirm a first weight having a value of '0' among weights related with input data, and forward a second weight not having a value of '0' among the weights, to the MAC array 215, and at least one processor 120 configured to include the MAC activation control unit 217 for enabling to forward the weights to the MAC array 215, and inactivate at least one MAC unit corresponding to the first weight among the plurality of MAC units included in the MAC array 215 and activate at least one MAC unit corresponding to the second weight. The at least one processor 120 may be configured to acquire the input data, and acquire the weights, and select the mode of the electronic device 101 by using the switch 211, and in response to a first mode of the electronic device 101 being selected, perform convolution operations between the input data, and the second weight forwarded to the MAC array 215 through the zero weight skip unit 213, and in response to a third mode of the electronic device 101 being selected, perform convolution operations between the input data, and the weights forwarded to the MAC array 215 through the MAC activation control unit 217.

In various embodiments, the at least one processor 120 may be configured to, in response to the input data being image data, select the mode of the electronic device 101 at least partially on the basis of a resolution of the image data.

In various embodiments, the at least one processor 120 may be configured to select the mode of the electronic device 101 according to whether the input data is data related with a specified application or a specified function of the application.

In various embodiments, the at least one processor 120 may be configured to select the mode of the electronic device 101 on the basis of at least one of a consumed power of the electronic device 101, a state of the battery 189, or a temperature of the electronic device 101.

In various embodiments, the at least one processor 120 may be configured to select the mode of the electronic device 101, at least partially on the basis of a load of a system.

In various embodiments, the at least one processor 120 may be configured to select the mode of the electronic device 101 on the basis of a user input of selecting the first mode or the third mode.

In various embodiments, the at least one processor 120 may include the NPU 210 including the switch 211, the MAC array 215, the zero weight skip unit 213, and the MAC activation control unit 217.

Figure 7:
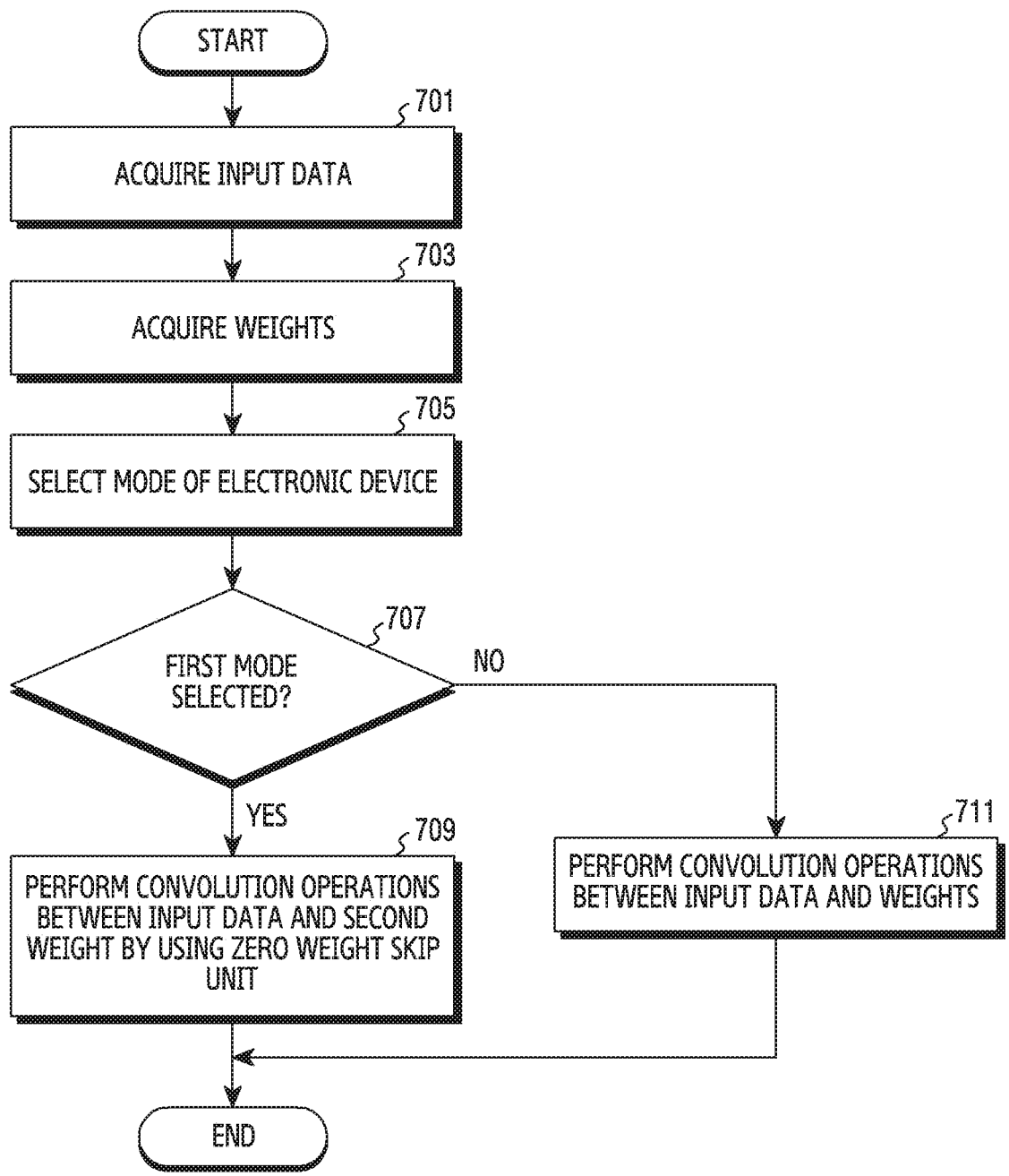
FIG. 7 is a flowchart for explaining a method for processing data by using a neural network, according to an embodiment of the disclosure.

FIG. 7 is a flowchart for explaining a method for processing data by using a neural network, according to an embodiment of the disclosure.

Referring to FIG. 7, in an embodiment, the processor 120 may acquire input data in operation 701. For example, in response to an input related with the execution of a function of an application, the processor 120 may acquire input data.

In operation 703, in an embodiment, the processor 120 may acquire weights related with the input data. For example, the processor 120 may acquire, from a server (e.g., the server 108), weights learned using a neural network. In an embodiment, the processor 120 may store, in the memory 130, the weights acquired from the server (e.g., the server 108). In an embodiment, at input data acquisition, the processor 120 may confirm weights related with the input data and acquire (or search) the confirmed weights.

In operation 705, in an embodiment, the processor 120 may select a mode of the electronic device 101. For example, the processor 120 may select, through the switch 211, a first mode of performing a convolution operation for weights by using the zero weight skip unit 213 or a second mode of performing a convolution operation without using the zero weight skip unit 213 (or by forwarding the weights from the switch 211 directly to the MAC array 215).

In an embodiment, the processor 120 may provide a mode of the electronic device 101, at least partially on the basis of a situation of the electronic device 101.

In an embodiment, the processor 120 may provide a mode of the electronic device 101, at least partially on the basis of a setting of the electronic device 101.

In an embodiment, in response to input data being image data, the processor 120 may provide a mode of the electronic device 101, at least partially on the basis of a resolution setting. For example, in response to a resolution of a raw image acquired through a camera (e.g., the camera module 180) being set as a specified resolution or more (e.g., full high-definition (FHD), wide quad high-definition (WQHD), or ultra high-definition (UHD)), the processor 120 may provide the mode of the electronic device 101 as a first mode. In response to the resolution of the input image being set less than the specified resolution, the processor 120 may provide the mode of the electronic device 101 as a second mode. For another example, in response to a resolution of an output image (e.g., a resolution of an image processed through the camera module 180 or an image displayed as a preview screen, or a resolution at the time of storing an acquired image) being set as a specified resolution or more, the processor 120 may provide the mode of the electronic device 101 as the first mode. In response to the resolution of the output image being set less than the specified resolution, the processor 120 may provide the mode of the electronic device 101 as the second mode. In an embodiment, in response to a resolution of image data being set as a specified resolution or more, the processor 120 may provide the mode of the electronic device 101 as the first mode, thereby processing the image data with better performance (or at a faster speed). However, the setting of the electronic device 101 is not limited to the aforementioned resolution setting.

In an embodiment, the processor 120 may provide a mode of the electronic device 101, at least partially on the basis of a specified application or a specified function of the specified application. For example, in response to acquiring input data related with an application which, at execution, consumes a load or power of a system of a specified quantity or more or a function of the application, the processor 120 may provide the mode of the electronic device 101 as a second mode. In response to acquiring input data related with an application which, at execution, consumes a load or power of the system less than the specified quantity or a function of the application, the processor 120 may provide the mode of the electronic device 101 as a first mode. In an embodiment, in response to acquiring the input data related with the application which, at execution, consumes the load or power of the system of the specified quantity or more or the function of the application, the processor 120 may provide the mode of the electronic device 101 as the second mode, thereby consuming the power efficiently (or sustainably).

In an embodiment, the processor 120 may provide a mode of the electronic device 101 at least partially on the basis of a consumed power (or a power consumption state) of the electronic device 101. For example, in response to a brightness of a display (e.g., the display device 160) being equal to or being greater than a specified brightness (e.g., 200 candelas), the processor 120 may provide the mode of the electronic device 101 as a second mode. In response to the brightness of the display (e.g., the display device 160) being less than the specified brightness, the processor 120 may provide the mode of the electronic device 101 as a first mode.

In an embodiment, the processor 120 may provide a mode of the electronic device 101, at least partially on the basis of a state of the battery 189. For example, in response to a remnant level of the battery 189 being less than a specified remnant level or the battery 189 being in a power saving mode, the processor 120 may provide the mode of the electronic device 101 as a second mode. In response to the remnant level of the battery 189 being equal to or being greater than the specified remnant level or the battery 189 being in a normal mode, the processor 120 may provide the mode of the electronic device 101 as a first mode.

In an embodiment, the processor 120 may provide a mode of the electronic device 101, at least partially on the basis of a temperature (or a heating state) of the electronic device 101. For example, in response to the temperature of the electronic device 101 being equal to or being greater than a specified temperature, the processor 120 may provide the mode of the electronic device 101 as a second mode. In response to the temperature of the electronic device 101 being less than the specified temperature, the processor 120 may provide the mode of the electronic device 101 as a first mode.

In an embodiment, the processor 120 may provide a mode of the electronic device 101, at least partially on the basis of a load of a system. For example, in response to a current load of the system being equal to or being greater than a specified load, the processor 120 may provide the mode of the electronic device 101 as a second mode. In response to the current load of the system being less than the specified load, the processor 120 may provide the mode of the electronic device 101 as a first mode.

In an embodiment, the processor 120 may provide a mode of the electronic device 101 according to a rate (or the number) of a weight having a value '0' in weights. For example, in response to the rate (or the number) of the weight having the value '0' in the weights being equal to or being greater than a specified rate, the processor 120 may provide the mode of the electronic device 101 as a first mode. In response to the rate (or the number) of the weight having the value '0' in the weights being less than the specified rate, the processor 120 may provide the mode of the electronic device 101 as a second mode.

In an embodiment, the processor 120 may provide a mode of the electronic device 101, at least partially on the basis of a user input. For example, the processor 120 may provide the mode of the electronic device 101, at least partially on the basis of a user input of selecting a first mode or a second mode.

In an embodiment, the processor 120 may control an operation of the switch 211 to select a provided mode of the electronic device 101. For example, in response to a first mode being selected, the processor 120 may forward a control signal to the switch 211 wherein the switch 211 is connected with the zero weight skip unit 213. In response to a second mode being selected, the processor 120 may forward a control signal to the switch 211 wherein the switch 211 is connected with the MAC array 215.

In operation 707, in an embodiment, it is determined if the mode of the electronic device 101 is selected as the first mode. If it is determined in operation 707 that the mode of the electronic device 101 is selected as the first mode, in operation 709, in an embodiment, the processor 120 may control the MAC array 215 to perform convolution operations between input data and the second weight by using the zero weight skip unit 213.

In an embodiment, the zero weight skip unit 213 may forward the second weight among the weights received from the switch 211. In an embodiment, the zero weight skip unit 213 may confirm a first weight (or a second weight) among the weights received from the switch 211. The zero weight skip unit 213 may confirm a position (or coordinate) of the first weight in the weights received from the switch 211.

In an embodiment, the zero weight skip unit 213 may control convolution operations between input data and a second weight, carried out by the MAC array 215. In an embodiment, the zero weight skip unit 213 may schedule the convolution operations between the input data and the second weight, carried out by the MAC array 215.

In an embodiment, in response to receiving a second weight from the zero weight skip unit 213, the MAC array 215 may perform convolution operations between input data and the second weight. In an embodiment, the MAC array 215 may perform convolution operations between the second weight and values corresponding to a region of the input data corresponding to the second weight.

If it is determined in operation 707 that the mode of the electronic device 101 is not selected as the first mode, in operation 711, in an embodiment, the processor 120 may enable the MAC array 215 to perform convolution operations between the input data and the weights. For example, the processor 120 may enable the MAC array 215 to perform convolution operations between values of the input data and the entire weights.

Figure 8:
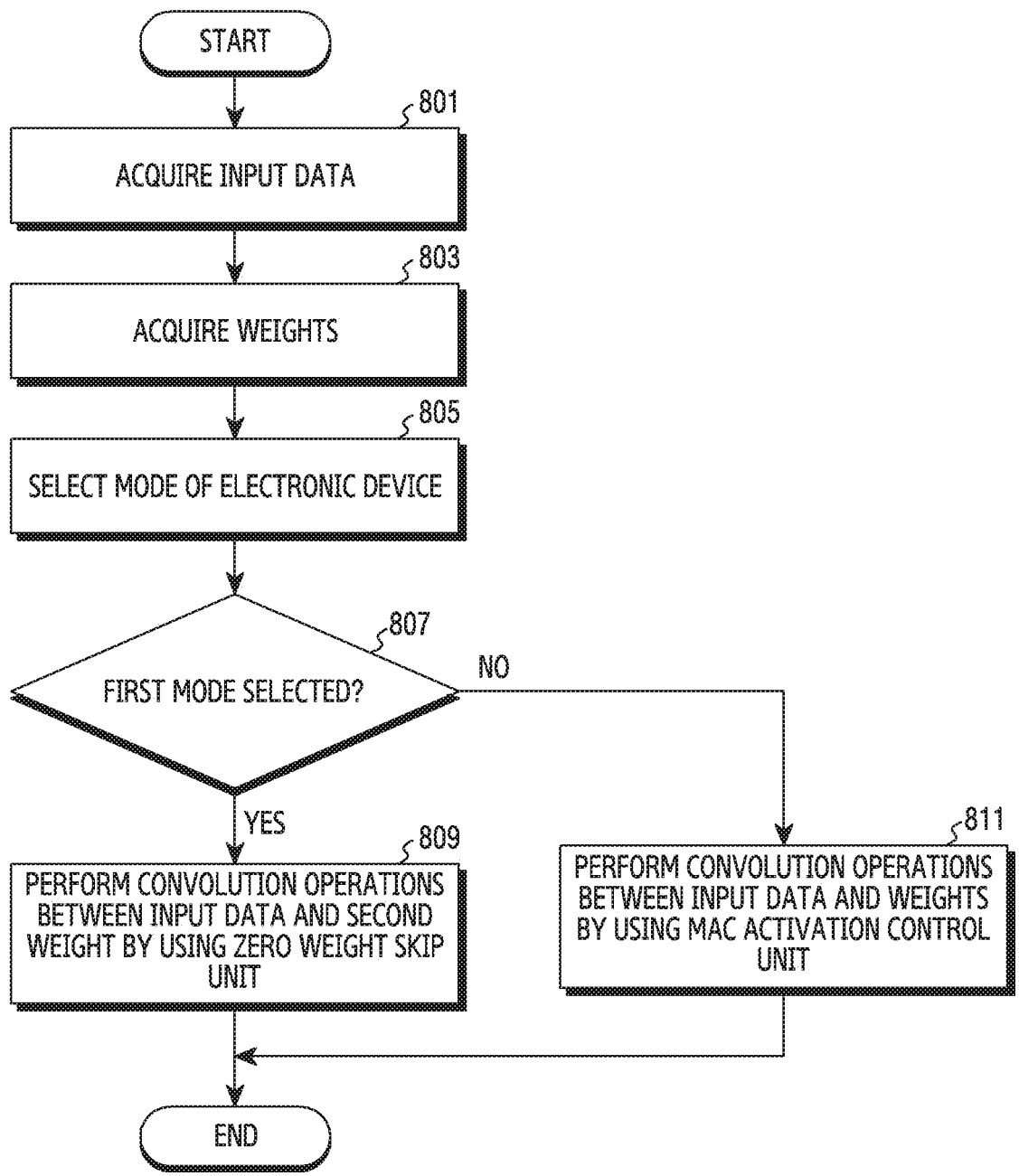
FIG. 8 is a flowchart for explaining a method for processing data by using a neural network, according to an embodiment of the disclosure.

FIG. 8 is a flowchart for explaining a method for processing data by using a neural network, according to an embodiment of the disclosure.

Referring to FIG. 8, in an embodiment, the processor 120 may acquire input data in operation 801. For example, in response to an input related with the execution of a function of an application, the processor 120 may acquire input data.

In operation 803, in an embodiment, the processor 120 may acquire weights related with the input data. For example, the processor 120 may acquire weights learned using a neural network from a server (e.g., the server 108). In an embodiment, the processor 120 may store, in the memory 130, the weights acquired from the server (e.g., the server 108). In an embodiment, at input data acquisition, the processor 120 may confirm weights related with the input data and acquire (or search) the confirmed weights.

In operation 805, in an embodiment, the processor 120 may select a mode of the electronic device 101. For example, the processor 120 may select, through the switch 211, a first mode of performing a convolution operation for weights by using the zero weight skip unit 213 or a third mode of performing a convolution operation by using the MAC activation control unit 217.

In an embodiment, the processor 120 may provide a mode of the electronic device 101, at least partially on the basis of a setting of the electronic device 101.

In an embodiment, in response to the input data being image data, the processor 120 may provide a mode of the electronic device 101, at least partially on the basis of a resolution setting. For example, in response to a resolution of a raw image acquired through a camera (e.g., the camera module 180) being set as a specified resolution or more, the processor 120 may provide the mode of the electronic device 101 as a first mode. In response to the resolution of the input image being set less than the specified resolution, the processor 120 may provide the mode of the electronic device 101 as a third mode. For another example, in response to a resolution of an output image being set as a specified resolution or more, the processor 120 may provide the mode of the electronic device 101 as the first mode. In response to the resolution of the output image being set less than the specified resolution, the processor 120 may provide the mode of the electronic device 101 as the third mode.

In an embodiment, the processor 120 may provide a mode of the electronic device 101, at least partially on the basis of a specified application or a specified function of the specified application. For example, in response to acquiring input data related with an application which, at execution, consumes a load or power of a system of a specified quantity or more or a function of the application, the processor 120 may provide the mode of the electronic device 101 as a third mode. In response to acquiring input data related with an application which, at execution, consumes a load or power of the system less than the specified quantity or a function of the application, the processor 120 may provide the mode of the electronic device 101 as a first mode.

In an embodiment, the processor 120 may provide a mode of the electronic device 101, at least partially on the basis of a consumed power of the electronic device 101. For example, in response to a brightness of a display (e.g., the display device 160) being equal to or being greater than a specified brightness (e.g., 200 candelas), the processor 120 may provide the mode of the electronic device 101 as a third mode. In response to the brightness of the display (e.g., the display device 160) being less than the specified brightness, the processor 120 may provide the mode of the electronic device 101 as a first mode.

In an embodiment, the processor 120 may provide a mode of the electronic device 101, at least partially on the basis of a state of the battery 189. For example, in response to a remnant level of the battery 189 being less than a specified remnant level or the battery 189 being in a power saving mode, the processor 120 may provide the mode of the electronic device 101 as a third mode. In response to the remnant level of the battery 189 being equal to or being greater than the specified remnant level or the battery 189 being in a normal mode, the processor 120 may provide the mode of the electronic device 101 as a first mode.

In an embodiment, the processor 120 may provide a mode of the electronic device 101, at least partially on the basis of a temperature of the electronic device 101. For example, in response to the temperature of the electronic device 101 being equal to or being greater than a specified temperature, the processor 120 may provide the mode of the electronic device 101 as a third mode. In response to the temperature of the electronic device 101 being less than the specified temperature, the processor 120 may provide the mode of the electronic device 101 as a first mode.

In an embodiment, the processor 120 may provide a mode of the electronic device 101, at least partially on the basis of a load of a system. For example, in response to a current load of the system being equal to or being greater than a specified load, the processor 120 may provide the mode of the electronic device 101 as a third mode. In response to the current load of the system being less than the specified load, the processor 120 may provide the mode of the electronic device 101 as a first mode.

In an embodiment, the processor 120 may provide a mode of the electronic device 101 according to a rate (or the number) of a weight having a value '0' in weights. For example, in response to the rate (or the number) of the weight having the value '0' in the weights being equal to or being greater than a specified rate, the processor 120 may provide the mode of the electronic device 101 as a first mode. In response to the rate (or the number) of the weight having the value '0' in the weights being less than the specified rate, the processor 120 may provide the mode of the electronic device 101 as a third mode.

In an embodiment, the processor 120 may provide a mode of the electronic device 101, at least partially on the basis of a user input. For example, the processor 120 may provide the mode of the electronic device 101, at least partially on the basis of a user input of selecting a first mode or a third mode.

In an embodiment, the processor 120 may control an operation of the switch 211 to select a provided mode of the electronic device 101. For example, in response to a first mode being selected, the processor 120 may forward a control signal to the switch 211 wherein the switch 211 is connected with the zero weight skip unit 213. In response to a third mode being selected, the processor 120 may forward a control signal to the switch 211 wherein the switch 211 is connected with the MAC activation control unit 217.

In operation 807, in an embodiment, it is determined if the mode of the electronic device 101 is selected as the first mode. If it is determined in operation 807 that the mode of the electronic device 101 is selected as the first mode, in operation 809, in an embodiment, the processor 120 may control the MAC array 215 to perform convolution operations between input data and a second weight by using the zero weight skip unit 213.

In an embodiment, the zero weight skip unit 213 may forward a second weight among the weights received from the switch 211. In an embodiment, the zero weight skip unit 213 may confirm a first weight (or second weight) among the weights received from the switch 211. The zero weight skip unit 213 may confirm a position (or coordinate) of the first weight in the weights received from the switch 211.

In an embodiment, the zero weight skip unit 213 may control convolution operations between input data and a second weight, carried out by the MAC array 215. In an embodiment, the zero weight skip unit 213 may schedule the convolution operations between the input data and the second weight, carried out by the MAC array 215.

In an embodiment, in response to receiving a second weight from the zero weight skip unit 213, the MAC array 215 may perform convolution operations between input data and the second weight. In an embodiment, the MAC array 215 may perform convolution operations between the second weight and values corresponding to a region of the input data corresponding to the second weight.

If it is determined in operation 807 that the mode of the electronic device 101 is not selected as a first mode, in operation 811, in an embodiment, the processor 120 may enable the MAC array 215 to perform convolution operations between input data and weights by using the MAC activation control unit 217. For example, the MAC activation control unit 217 may confirm a first weight having a value '0' among the weights. The MAC activation control unit 217 may inactivate a MAC unit corresponding to the first weight (or a position of the first weight) and activate a MAC unit corresponding to the second weight (or a position of the second weight). The MAC activation control unit 217 may control the MAC array 215 to perform convolution operations between input data inputted to the activated MAC unit and the second weight.

Figure 9:
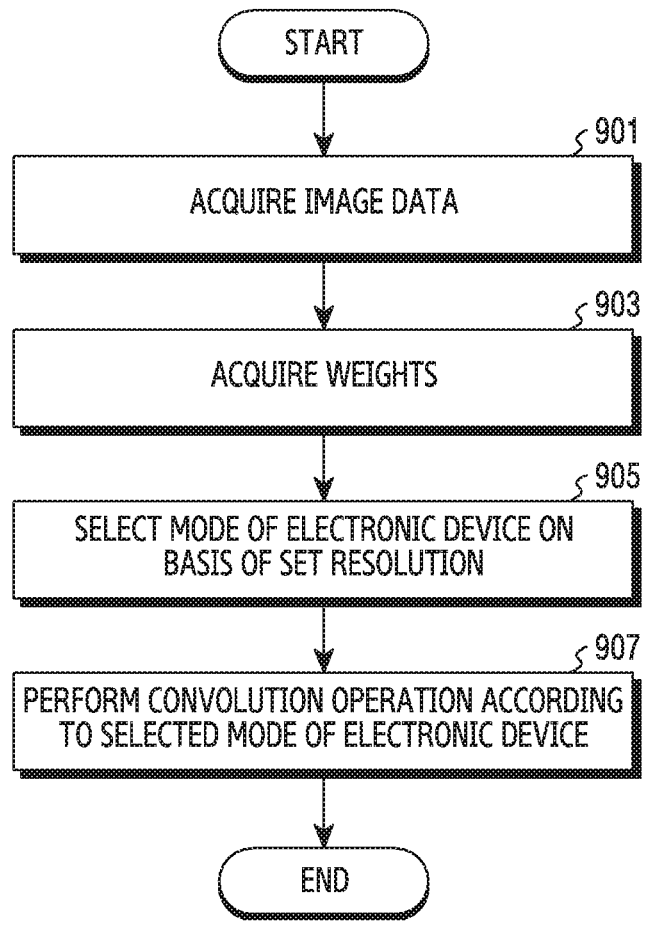
FIG. 9 is a flowchart for explaining a method for processing data by using a neural network on the basis of a resolution, according to an embodiment of the disclosure.

FIG. 9 is a flowchart for explaining a method for processing data by using a neural network on the basis of a resolution, according to an embodiment of the disclosure.

Referring to FIG. 9, in an embodiment, the processor 120 may acquire image data as input data in operation 901. For example, in response to an input of executing a camera application, the processor 120 may acquire image data that is captured using a camera.

In operation 903, in an embodiment, the processor 120 may acquire weights related with the image data. For example, the processor 120 may acquire, from a server (e.g., the server 108), weights learned using a neural network (e.g., weights necessary for obtaining an edge or gradient in an image). In an embodiment, the processor 120 may store, in the memory 130, the weights acquired from the server (e.g., the server 108). In an embodiment, at input data acquisition, the processor 120 may confirm weights related with input data and acquire (or search) the confirmed weights.

In operation 905, in an embodiment, the processor 120 may select a mode of the electronic device 101, on the basis of a set resolution. For example, on the basis of the set resolution, the processor 120 may select, through the switch 211, a first mode of performing a convolution operation for weights by using the zero weight skip unit 213 or a second mode of performing a convolution operation without using the zero weight skip unit 213 (or a third mode of performing a convolution operation by using the MAC activation control unit 217).

In an embodiment, the processor 120 may confirm the setting of a resolution of an input image or the setting of a resolution of an output image.

In an embodiment, in response to a resolution of an input image (or a raw image) acquired through a camera (e.g., the camera module 180) being set as a specified resolution or more (e.g., full high-definition (FHD), wide quad high-definition (WQHD), or ultra high-definition (UHD)), the processor 120 may provide a mode of the electronic device 101 as a first mode.

In an embodiment, in response to the resolution of the input image being set less than the specified resolution, the processor 120 may provide the mode of the electronic device 101 as a second mode (or a third mode).

In an embodiment, in response to a resolution of an output image (e.g., a resolution of an image processed through the camera module 180 or an image displayed as a preview screen, or a resolution at the time of storing an acquired image) being set as a specified resolution or more, the processor 120 may provide the mode of the electronic device 101 as the first mode.

In an embodiment, in response to the resolution of the output image being set less than the specified resolution, the processor 120 may provide the mode of the electronic device 101 as the second mode (or the third mode).

However, the setting of the electronic device 101 is not limited to the aforementioned resolution setting.

In operation 907, in an embodiment, the processor 120 may perform a convolution operation according to the selected mode of the electronic device 101.

The operation of performing the convolution operation according to the selected mode of the electronic device is at least partially the same as or similar with operation 709 and operation 711 of FIG. 7 or operation 809 and operation 811 of FIG. 9 and thus, a detailed description is omitted.

Figure 10:
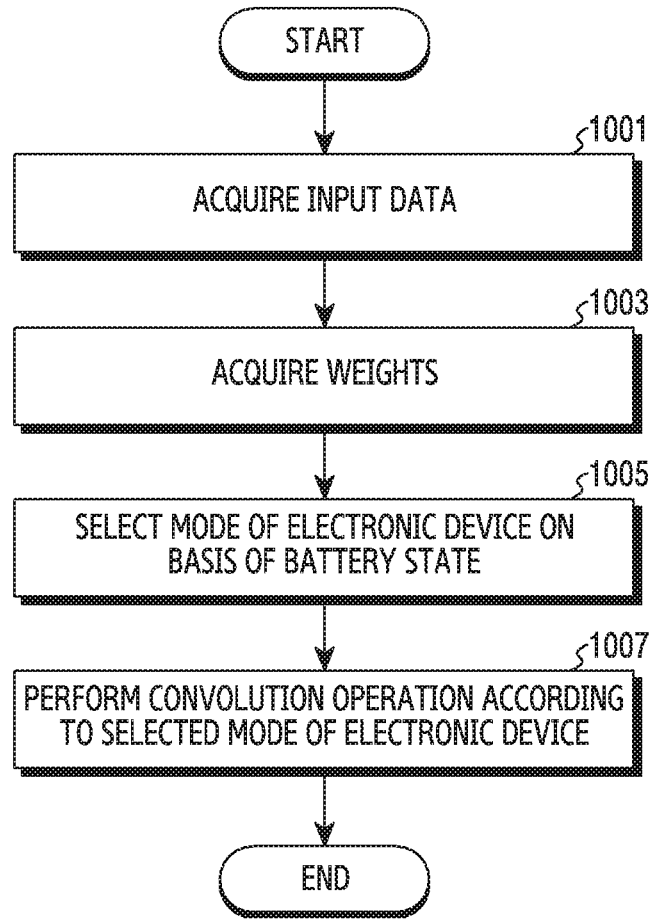
FIG. 10 is a flowchart for explaining a method for processing data by using a neural network on the basis of a battery state, according to an embodiment of the disclosure.

FIG. 10 is a flowchart for explaining a method for processing data by using a neural network on the basis of a battery state, according to an embodiment of the disclosure.

Referring to FIG. 10, in an embodiment, the processor 120 may acquire input data in operation 1001. For example, in response to an input related with the execution of a function of an application, the processor 120 may acquire input data.

In operation 1003, in an embodiment, the processor 120 may acquire weights related with the input data. For example, the processor 120 may acquire, from a server (e.g., the server 108), weights learned using a neural network (e.g., weights necessary for obtaining an edge or gradient in an image). In an embodiment, the processor 120 may store, in the memory 130, the weights acquired from the server (e.g., the server 108). In an embodiment, at input data acquisition, the processor 120 may confirm weights related with input data and acquire (or search) the confirmed weights.

In operation 1005, in an embodiment, the processor 120 may select a mode of the electronic device 101 on the basis of a battery state. For example, on the basis of the battery state, the processor 120 may select, through the switch 211, a first mode of performing a convolution operation for weights by using the zero weight skip unit 213 or a second mode of performing a convolution operation without using the zero weight skip unit 213 (or a third mode of performing a convolution operation by using the MAC activation control unit 217).

In an embodiment, the processor 120 may confirm the setting of an operation mode related with a state of a battery, for example, a remnant level of the battery or the power consumption of the electronic device 101. In an embodiment, the processor 120 may confirm the remnant level of the battery which is measured using a battery gauge of the power management module 188.

In an embodiment, in response to a remnant level of the battery 189 being less than a specified remnant level or the battery 189 being in a power saving mode, the processor 120 may provide a mode of the electronic device 101 as a second mode.

In an embodiment, in response to the remnant level of the battery 189 being equal to or being greater than the specified remnant level or the battery 189 being in a normal mode, the processor 120 may provide the mode of the electronic device 101 as a first mode.

In operation 1007, in an embodiment, the processor 120 may perform a convolution operation according to the selected mode of the electronic device.

The operation of performing the convolution operation according to the selected mode of the electronic device is at least partially the same as or similar with operation 709 and operation 711 of FIG. 7 or operation 809 and operation 811 of FIG. 9 and thus, a detailed description is omitted.

Figure 11:
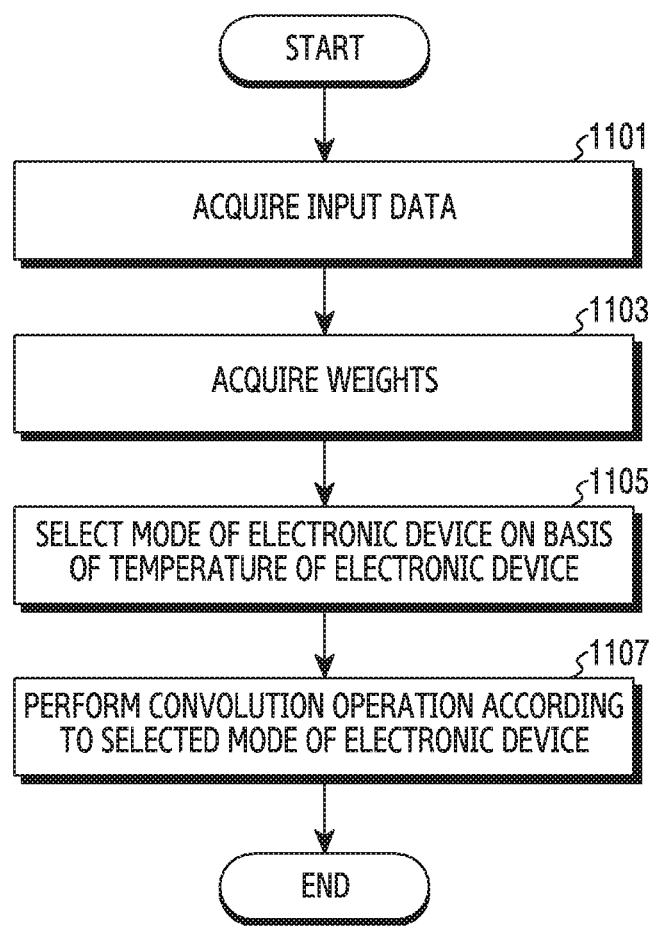
FIG. 11 is a flowchart for explaining a method for processing data by using a neural network on the basis of a temperature (or a heating state) of an electronic device, according to an embodiment of the disclosure.

FIG. 11 is a flowchart for explaining a method for processing data by using a neural network on the basis of a temperature (or a heating state) of an electronic device, according to an embodiment of the disclosure.

Referring to FIG. 11, in an embodiment, the processor 120 may acquire input data in operation 1101. For example, in response to an input related with the execution of a function of an application, the processor 120 may acquire input data.

In operation 1103, in an embodiment, the processor 120 may acquire weights related with the input data. For example, the processor 120 may acquire, from a server (e.g., the server 108), weights learned using a neural network (e.g., weights necessary for obtaining an edge or gradient in an image). In an embodiment, the processor 120 may store, in the memory 130, the weights acquired from the server (e.g., the server 108). In an embodiment, at input data acquisition, the processor 120 may confirm weights related with input data and acquire (or search) the confirmed weights.

In operation 1105, in an embodiment, the processor 120 may select a mode of the electronic device 101, on the basis of a temperature (or a heating state) of the electronic device. For example, on the basis of a battery state, the processor 120 may select, through the switch 211, a first mode of performing a convolution operation for weights by using the zero weight skip unit 213 or a second mode of performing a convolution operation without using the zero weight skip unit 213 (or a third mode of performing a convolution operation by using the MAC activation control unit 217).

In an embodiment, the processor 120 may confirm a temperature of the electronic device 101. For example, the processor 120 may confirm a temperature of the electronic device 101, which is measured using a temperature sensor included in the electronic device 101.

In an embodiment, the processor 120 may provide a mode of the electronic device 101, at least partially on the basis of a temperature (or a heating state) of the electronic device 101. For example, in response to the temperature of the electronic device 101 being equal to or being greater than a specified temperature, the processor 120 may provide the mode of the electronic device 101 as a second mode. In response to the temperature of the electronic device 101 being less than the specified temperature, the processor 120 may provide the mode of the electronic device 101 as a first mode.

In operation 1107, in an embodiment, the processor 120 may perform a convolution operation according to the selected mode of the electronic device.

The operation of performing the convolution operation according to the selected mode of the electronic device is at least partially the same as or similar with operation 709 and operation 711 of FIG. 7 or operation 809 and operation 811 of FIG. 9 and thus, a detailed description is omitted.

A method of various embodiments of the disclosure may include acquiring input data, and acquiring weights related with the input data, and selecting a mode of the electronic device 101, and in response to a first mode of the electronic device 101 being selected, performing convolution operations between the input data, and the second weight forwarded to the MAC array 215 through the zero weight skip unit 213 for confirming a first weight having a value of '0' among the weights and forwarding a second weight not having a value of '0' among the weights, to the MAC array 215, and in response to a third mode of the electronic device 101 being selected, performing convolution operations between the input data, and the weights forwarded to the MAC array 215.

In various embodiments, selecting the mode of the electronic device 101 may include, in response to the input data being image data, selecting the mode of the electronic device 101 at least partially on the basis of a resolution of the image data.

In various embodiments, selecting the mode of the electronic device 101 may include selecting the mode of the electronic device 101 according to whether the input data is data related with a specified application or a specified function of the application.

In various embodiments, selecting the mode of the electronic device 101 may include selecting the mode of the electronic device 101 on the basis of at least one of a consumed power of the electronic device 101, a state of the battery 189, or a temperature of the electronic device 101.

In various embodiments, selecting the mode of the electronic device 101 may include selecting the mode of the electronic device 101 at least partially on the basis of a load of a system.

In various embodiments, selecting the mode of the electronic device 101 may include selecting the mode of the electronic device 101 on the basis of a user input of selecting the first mode or the second mode.

Also, a data structure used in the aforementioned embodiment of the disclosure may be recorded in a computer-readable recording medium through various means. The computer-readable recording medium includes a storage medium such as a magnetic storage medium (for example, a read only memory (ROM), a floppy disc, a hard disc, etc.) and/or an optical reading medium (for example, a compact disc-ROM (CD-ROM), a digital versatile disc (DVD), etc.).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a switch configured to select a mode of the electronic device;

a multiply and accumulate (MAC) array configured to comprise a plurality of MAC units; and at least one processor configured to comprise a neural processor unit (NPU) including a zero weight skip unit and a MAC activation control unit, wherein the zero weight skip unit confirms a position of a first weight having a value of '0' among weights in a weight matrix related with input data and forwards a second weight not having a value of '0' among the weights in the weight matrix, to the MAC array, and wherein the MAC activation control unit forwards the weights to the MAC array and controls convolution operations between the input data and the weights, carried out by the MAC array, wherein the at least one processor is configured to:
acquire the input data,
acquire the weights in the weight matrix,
select the mode of the electronic device by using the switch,
in response to a first mode of the electronic device being selected, perform convolution operations between the input data and the second weight forwarded to the MAC array through the zero weight skip unit,
in response to a second mode of the electronic device being selected, perform convolution operations between the input data and the weights forwarded to the MAC array, and
in response to a third mode of the electronic device being selected, inactivate a MAC unit corresponding to the position of the first weight and activate a MAC unit corresponding to a position of the second weight.

2. The electronic device of claim 1, wherein the at least one processor is further configured to, in response to the input data being image data, select the mode of the electronic device at least partially based on a resolution of the image data.

3. The electronic device of claim 1, wherein the at least one processor is further configured to select the mode of the electronic device according to whether the input data is data related with a specified application or a specified function of the application.

4. The electronic device of claim 1, wherein the at least one processor is further configured to select the mode of the electronic device based on at least one of a consumed power of the electronic device, a state of a battery, or a temperature of the electronic device.

5. The electronic device of claim 1, wherein the at least one processor is further configured to select the mode of the electronic device, at least partially based on a load of a system.

6. The electronic device of claim 1, wherein the at least one processor is further configured to select the mode of the electronic device based on a user input of selecting the first mode, the second mode, or the third mode.

7. The electronic device of claim 1, wherein the NPU comprises the switch, the MAC array, the zero weight skip unit, and the MAC activation unit.

8. A method of an electronic device, the method comprising:
acquiring input data;
acquiring weights in a weight matrix related with the input data, wherein the weights include a first weight having a value of '0' and a second weight not having the value of '0';
selecting a mode;
in response to a first mode of the electronic device being selected, performing convolution operations between the input data and a second weight forwarded to a multiply and accumulate (MAC) array through a zero weight skip unit for confirming a position of the first weight having the value of '0' among the weights, and forwarding the second weight not having the value of '0' among the weights, to the MAC array;
in response to a second mode of the electronic device being selected, performing convolution operations between the input data and the weights forwarded to the MAC array; and
in response to a third mode of the electronic device being selected, inactivating a MAC unit corresponding to the position of the first weight and activating a MAC unit corresponding to a position of the second weight, by using a MAC activation control unit for forwarding the weights to the MAC array and controlling convolution operations between the input data and the weights, carried out by the MAC array.

9. The method of claim 8, wherein the selecting of the mode comprises, in response to the input data being image data, selecting the mode at least partially based on a resolution of the image data.

10. The method of claim 8, wherein the selecting of the mode comprises selecting the mode according to whether the input data is data related with a specified application or a specified function of the application.

11. The method of claim 8, wherein the selecting of the mode comprises selecting the mode based on at least one of a consumed power, a state of a battery, or a temperature.

12. The method of claim 8, wherein the selecting of the mode comprises selecting the mode at least partially based on a load of a system.

13. The method of claim 8, wherein the selecting of the mode comprises selecting the mode based on a user input of selecting the first mode, the second mode, or the third mode.

* * * * *